June 2, 1953  C. J. NADOLNY  2,640,292
FISH LURE
Filed May 4, 1949

INVENTOR.
Clarence J. Nadolny.
BY
Frank C. Herman.
ATTORNEY

Patented June 2, 1953

2,640,292

UNITED STATES PATENT OFFICE 2,640,292

FISH LURE

Clarence J. Nadolny, Bay City, Mich.

Application May 4, 1949, Serial No. 91,261

1 Claim. (Cl. 43—41)

This invention relates to fish lures and more particularly to that class of lures which is formed with a hollow, transparent body section in which a live minnow or bait can be inserted, so that it is clearly visible as it is drawn through the water.

One of the prime objects of the invention is to design a sectional lure in the form of a fish, which can be used for casting or trolling, or for still fishing if so desired.

Another object is to provide a fish-shaped hollow lure made up with detachable head and tail sections, providing a passage for insertion or removal of the bait when the head is removed, and further providing hook assemblies on the body, the means for fastening the hooks to the lure serving also to secure the head and tail sections to the main body.

A further object is to design a fish lure made up in three sections secured in interlocked, telescopic relation when assembled, these head and tail sections being of different width and thicknesses, so that the head and tail sections can be made up of relatively thinner material, thus eliminating considerable turning and forming, and the wastage of stock incident thereto.

With the above and other objects in view, the present invention consists in the combination and arrangement of parts, hereinafter more fully described, illustrated in the accompanying drawing, and more particularly pointed out in the appended claim, it being understood that changes may be made in the form, size, proportion, and minor details of construction, without departing from the spirit, or sacrificing any of the advantages of the invention.

Figure 2:
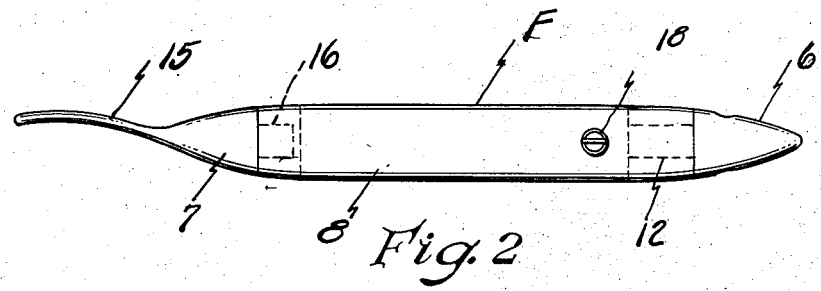
Fig. 2 is a top, plan view.
Figure 1:
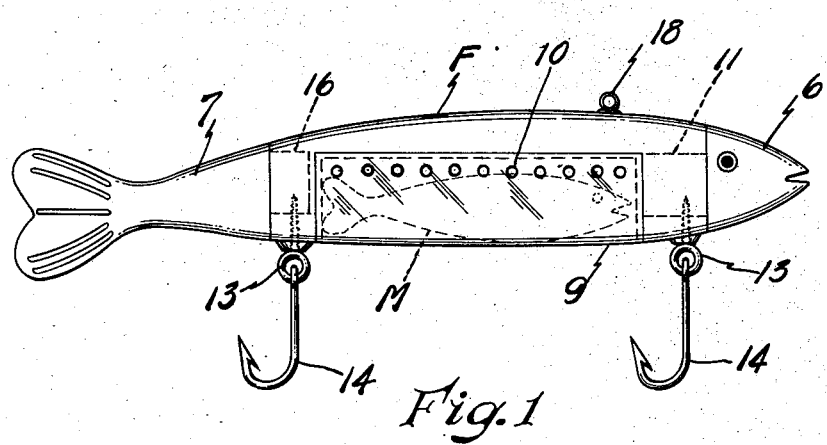
Fig. 1 is a side-elevational view of my improved fish lure showing a minnow in position therein.
Figure 3:
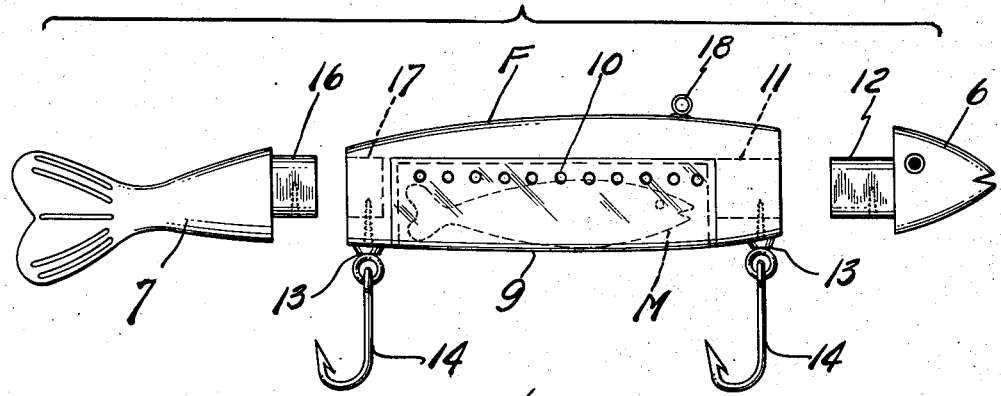
Fig. 3 is a side-elevational view showing the individual sections that make up the lure.

Referring now more particularly to the drawing in which I have shown the preferred embodiment of my invention, the letter F indicates the main body of the fish, which is preferably formed of wood, and comprises head, tail, and body sections 6, 7 and 8 respectively, the lower section of the body being cut away as shown, and a strip of transparent material 9 is shaped to form the belly section of the main body, and is secured thereto in any desired manner, said strip having a plurality of perforations 10 to permit free circulation of water therethrough.

A centrally disposed passage 11 is provided in the one end portion of the body and opens into the hollow belly section 9, and a turned end section 12 is provided on the head 6, said section slidably telescoping into the passage and forming a closure therefor, a removable screw-eye 13 being threaded into the body and turned section 12, and serves to secure the head in position, a cluster of hooks 14 being provided on the screw-eye in the usual manner.

To provide for life-like movement of the fish lure as it is drawn through the water, the tail section 7 is offset with relation to the main body as shown at 15 in Fig. 2, and this section is formed with a turned section 16, and the rear end of the body portion is formed with an aperture 17 adapted to slidably and telescopically accommodate the section 16, the tail section being held in assembled relation by means of another screw eye 13 which also accommodates a similar cluster of hooks 14.

To place the live minnow M in the lure, the operator removes the front screw-eye 13; this permits the head section 7 to be readily removed, after which the minnow M is inserted through the passage 11 into the belly B. The shouldered turned end section 12 is then inserted in the bore 11; the screw-eye 13 is next threaded to position, a line (not shown) then being attached, and the lure is ready for use.

The shape of the lure causes it to travel in a zig-zag course as it is pulled through the water, and the minnow can be used over and over again, as the perforations permit circulation of water through the belly, and the minnow is in no manner mutilated or damaged when a fish strikes or is hooked.

The lure can be readily manufactured and assembled, the sectional construction conserving both material and labor, the fastening means serving the dual purpose of hook anchorage as well as a securing means.

From the foregoing description, it will be obvious that I have perfected a simple, practical and effective fish lure for use by sportsmen and in which a live minnow may be confined.

What I claim is:

A sectional fish lure adapted to simulate a fish, comprising a central main body portion having its bottom recessed intermediate its ends, said main body portion being provided with a front end passage extending through the front end and open to the recessed bottom of said main body portion, and with a socket in its rear end, a transparent, perforated sheath embracing the recessed bottom of said main body portion to form a bait-accommodating chamber therein, a fish-head section having a turned projecting neck provided thereon for telescopic mounting in the front end passage of said main body, a fish-tail section formed with a turned, projecting neck for telescopic mounting in the rear end socket of said main body portion, screw eyes mounted in the front and rear ends of the main body portion and threaded into the turned, telescopically mounted necks of the head and tail sections respectively, for securing said sections in assembled relation on said body portion, and hooks on said body portion, and hooks on said screw eyes.

CLARENCE J. NADOLNY.

References Cited in the file of this patent

UNITED STATES PATENTS

| Number | Name | Date |
|---|---|---|
| 217,765 | Barber | July 22, 1879 |
| 428,422 | Skinner | May 20, 1890 |
| 1,470,842 | Hymas | Oct. 16, 1923 |
| 1,673,978 | Guindon | June 19, 1928 |
| 1,960,488 | Gray | May 29, 1934 |
| 1,993,990 | Catarau | Mar. 12, 1935 |
| 2,055,841 | Haislip | Sept. 29, 1936 |
| 2,112,385 | Smith | Mar. 29, 1938 |
| 2,201,267 | Jacobson | May 21, 1940 |
| 2,242,726 | Leusch | May 20, 1941 |
| 2,290,512 | Weesner | July 21, 1942 |
| 2,416,834 | Kuslich | Mar. 4, 1947 |
| 2,441,302 | Watkin | May 11, 1948 |
| 2,467,971 | Frair | Apr. 19, 1949 |